May 18, 1965   M. H. NORWALK   3,184,528

MOLDING TUBULAR BODIES

Filed Jan. 9, 1963

INVENTOR.
MARSHALL H. NORWALK
BY Clarence R. Petty Jr.
ATTORNEY

United States Patent Office 3,184,528
Patented May 18, 1965

3,184,528
MOLDING TUBULAR BODIES
Marshall H. Norwalk, Corning, N.Y., assignor to Corning Glass Works, Corning, N.Y., a corporation of New York
Filed Jan. 9, 1963, Ser. No. 250,330
18 Claims. (Cl. 264—314)

This invention relates to an improved method and apparatus for molding tubular bodies from comminuted or granulated moldable material in a tubular mold by means of fluid pressure causing a centrally disposed elastic tube to expand and compact the moldable material uniformly against the inner wall of the mold. In particular, the invention relates to the production of ceramic tubing possessing an exceptionally smooth, straight, uniform outer surface.

A commonly used method of forming tubing by fluid pressure acting on an elastic mold involves pressing a mass of comminuted moldable material around and against a mandrel by means of fluid pressure being exerted against the entire surface of a flexible rubber envelope surrounding the mass of moldable material. This method has been found to invariably produce tubing having rough, uneven, nonuniform outer surfaces, which are imparted thereto by the contacting rubber envelope and/or due to the inherent nonuniform density of the moldable material charged into the mold cavity.

Another known, but not so commonly used, method of using fluid pressure acting on an elastic mold wall to press tubular shapes from comminuted moldable material is that of pressing the moldable material against the inside surface of a tubular mold. In this method, rubber or other elastic tubing is disposed concentrically in the mold to form an annular space therebetween. Moldable material is placed in the annular space and fluid pressure is applied to the internal surfaces of the elastic tubing, thereby causing it to expand and press the moldable material against the internal surface of the mold. In this method, the external or outer surface characteristics of the molded tubular body are governed solely by the surface characteristics of the inside surface of the mold and the rigidity of the material of which the mold is made. Thus, it is necessary for the mold to have an extremely smooth inside surface and to be substantially nondeformable under the compacting pressure used to mold the tubular bodies. Tubular molds made of steel, aluminum and the like have the requisite nondeformable characteristic and the inside surfaces thereof can be ground and polished to a very smooth finish. However, producing such smooth internal surfaces is quite expensive and time consuming. Moreover, it has been found that the pressed tubular bodies adhere to the internal mold wall and are extremely difficult, if not impossible, to remove from the mold without breakage of them.

It is an object of this invention to provide a novel economical method of forming tubing from comminuted moldable material and having an exceptionally smooth, straight, uniform outer surface.

It is another object of this invention to provide a simple and economical method of forming tubing from comminuted moldable material whereby the tubing can be readily removed from the mold and handled without danger of breakage.

It is still another object of this invention to provide simple and economical apparatus for attaining the foregoing objects.

Other objects and advantages of the present invention will become apparent, to those skilled in the art, from the following detailed description and the attached drawings wherein.

Figure 1:
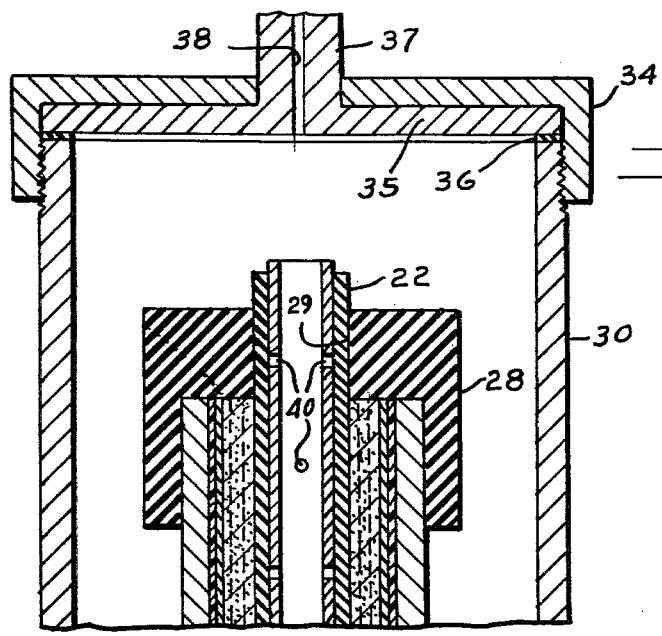
FIGURE 1 illustrates one embodiment of an apparatus, in axial section, according to the present invention.

The principal characterizing features of the present invention are: (1) the use of a mold liner of thin, smooth surfaced, flexible material disposed over the inner wall of a tubular mold and (2) the use of a thin layer of low friction, dry lubricant between the liner and the inner mold wall. These features afford the accomplishment of the objects of this invention as follows: the mold liner provides a simple and relatively inexpensive molding surface for forming the outer surface of the tubular bodies with the desired characteristics of smoothness, straightness and uniformity; the thin, low friction, dry lubricant layer allows easy ejection of the molded tubular body, together with the liner surrounding it, from the mold; the mold liner additionally provides support to the molded body against crumbling during ejection and against breakage during handling subsequent to ejection, and is easily removed, e.g. by stripping or peeling off the liner.

The mold liner can be made from a number of various thin sheet or strip materials commonly available and that are relatively inexpensive. Among such materials suitable for this purpose are metal shim stock, metal foil, sheets or tape of plastics (e.g. polyethylene or polytetrafluoroethylene), paper materials such as plastic coated paper (e.g. polyethylene coated freezer paper), waxed paper, bond paper or newsprint, and lacquer films. As is commonly and well known, metal shim stock is thin, resiliently flexible, rolled sheet or strip of metal, such as brass, spring steel, stainless steel, etc., having thicknesses on the order of thousandths or hundredths of an inch.

A material that is suitable for the low friction, dry lubricant is one that is predominantly polytetrafluoroethylene or one that has a coefficient of friction not substantially greater than the coefficient of polytetrafluoroethylene. As used in this specification and in the appended claims, the terms "low friction, dry lubricant" are defined as, and limited to, solid material having coefficients of friction not substantially greater than the corresponding coefficient of polytetrafluoroethylene and which is capable of being applied to a solid surface as a coating or film or of being formed into a thin layer, sheet or strip.

For a better understanding of the invention, reference is made to the attached drawings. Tubular mold 10 is made of any material rigid enough to undergo the pressures applied during compression of the moldable material without any significant deformation. In the embodiment shown, the mold must also be impermeable to the pressing fluid at the pressures used to press the moldable material. Usually metal or alloy tubing is preferred although in some cases other materials, such as hard rubber, rigid plastics and ceramics, can be used. Ordinary commercial aluminum pipe has been found very satisfactory and economical. The inner wall 12 of mold 10 is covered with a layer or film 14 of a low friction, dry lubricant, such as polytetrafluoroethylene. The latter material can be applied to surface 12 by any suitable means such as, for example, by the well known dispersion coating technique or by the method disclosed in the recently issued U.S. Patent No. 3,050,786. A particularly desirable lubricant coating is one composed essentially of about 75% by weight, polytetrafluoroethylene and about 25%, by weight, molybdenum disulfide. This latter coating is readily obtained by applying the aforementioned constituents to the surface 12 as a water dispersion, such as that sold under the trade name Molynamel "E" by The Lockrey Company, Southampton, New York. The dispersion can be brushed or flowed on surface 12, then air dried and cured at 150° C. for one hour to form a solid adherent film of lubricant according to the invention.

Figure 2:
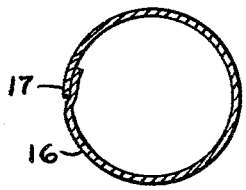
FIGURE 2 is an enlarged transverse sectional view of one embodiment of a mold liner according to the present invention.

After mold 10 is coated with lubricant film 14, a mold liner 16 is fitted inside the mold 10 so as to rest against film 14. Thus, a sheet of suitable liner material is formed into the annular liner 16. Preferably, the liner is made of metal shim stock as this material has been found to give the best outer surface characteristics to molded tubular bodies. A piece of metal shim stock is rolled up into an annular shape 16 conforming to the inside diameter of mold 10, with two edges of the piece overlapping as shown at 17 in FIGURE 2, and then positioned in the mold. Because of extreme thinness of the shim stock, the overlap at 17 will cause only a very slight impression in the outer surface of the molded body, which for most applications will not be objectionable. Of course, liner 16 can be made as an unbroken annular member or merely rolled up with the two edges abutting each other, if desired.

Figure 3:
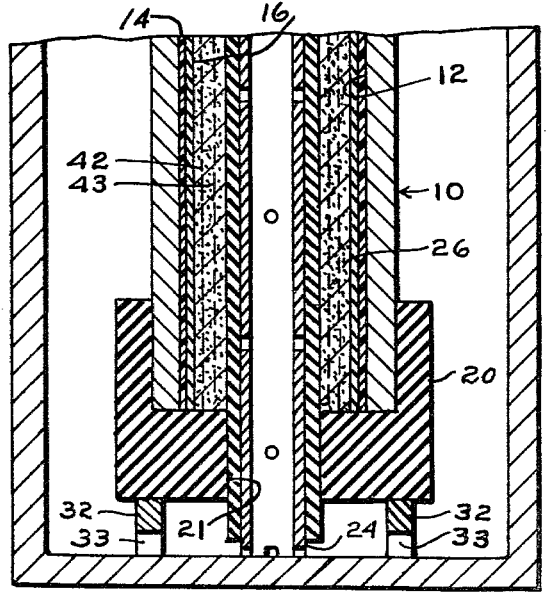
FIGURE 3 is a fragmentary view, in axial section, of a preferred form of mold liner according to the present invention.
Figure 3:
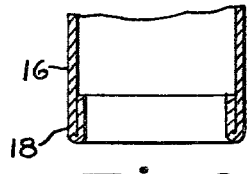

In some cases, it has been found desirable to roll or fold over the annular ends of the metal shim stock liner 16 as shown at 18 in FIGURE 3. This has been found to provide greater strength against crumbling of molded bodies during ejection, particularly when ejecting by means of a ram (not shown). If the depressions formed on the ends of the outer molded body surfaces by these rolled liner ends are objectionable, they can be cut off by suitable means.

An end cap 20, preferably of rubber (e.g. of the types commonly used for rubber stoppers), is tightly fitted over one end of mold 10. The cap 20 is provided with an axial opening 21 through which an elastic expandable tube 22, preferably of soft rubber, is disposed in tight fitting relation. The tight fit between tube 22 and opening 21 can be provided by any suitable means and this can be accomplished, as shown in FIGURE 1 by disposing a perforated rigid tube 24, preferably of metal, through tube 22. In addition, rigid tube 24 serves to axially position elastic tube 22 prior to filling the comminuted moldable material 26 in the annular space between tube 22 and liner 16.

While filling the annular mold cavity, the mold may be vibrated to allow for more uniform and more dense filling than is possible without vibration.

After annular mold cavity is completely filled with a batch of moldable material 26, an end cap 28 (similar to cap 20) is tightly fitted over the open end of mold 10 with the telescoped tubes 22 and 24 extending through an opening 29 in cap 28. The opening 29 is sized so as to tightly fit around tube 22 in the same manner as opening 21.

The mold 10, with all its assembled accessory part and moldable material charge, is placed in a suitable pressure container or chamber 30. To facilitate placement of the mold apparatus in the container 30, end cap 20 can be supported by an annular ring 32, which can be of any suitable material for the purposes (e.g. aluminum). The support ring 32 is preferably provided with radially spaced slots 33 to allow the pressure fluid access to both ends of tube 24. Container 30 and tube 24 are filled with a suitable pressure fluid, such as a mixture of glycerine and water, and then the open end of container 30 is closed by means of screw cap 34, flanged member 35 and annular pressure seal 36. Flanged member 35 has an annular extending portion 37 for coupling with any suitable source of fluid pressure (not shown). Pressure is exerted on the fluid in container 30 and tube 24 through opening 38 in portion 37. This causes the fluid in tube 24 to pass through openings 40 thereby acting upon elastic tube 22 so as to uniformly and radially expand tube 22 away from tube 24. The expansion of tube 22 is continued until it causes the moldable material 26 to be firmly compacted into a tubular body between tube 22 and the liner 16. The ultimate expanded position of tube 22 is illustratively indicated by the broken lines 42 and 43 in FIGURE 1.

The fluid pressure required to form the molded tubular body will vary, of course, depending upon the comminuted moldable material used. Generally, pressures of about 5,000 to 50,000 p.s.i. are sufficient in most cases.

After the moldable material 26 is firmly compacted into a tubular body, the pressure in container 30 is released through opening 38 and closure members 34, 35, 36 are removed. Then mold 10, with its attached accessories, is removed from container 30. Caps 20, 28 and tubes 22, 24 are then disassembled from mold 10. The molded tubular body of moldable material 26 is slidably removed from mold 10 by suitable means, preferably a flat circular ram having an outside diameter just sufficiently small enough to freely pass through the lubricant-coated mold 10. In some cases, particularly when forming fairly long lengths of tubing, it is desirable to slightly heat and slightly thermally expand the mold 10 (e.g. by heating in the range 75° to 150° C.) to assist in the ejection. As the tubular body is slidably ejected, the liner 16 will be ejected simultaneously, usually because it adheres to the outside surface of the tubular body. After ejection, the shim stock liner 16 can then be peeled off the molded body and the latter processed further as desired (e.g. firing to sinter the compacted material into a stronger body). The liner 16 provides the desired support to the molded body during ejection and a smooth, straight, uniform outer surface on the tubular body. Ejection is readily accomplished because the low friction, dry lubricant layer 14 allows the liner 16 to easily slide out of mold 10 during ejection. It will be appreciated, of course, that it is necessary to use a dry solid lubricant in order to avoid loss of the lubricant (and resulting undesirable contamination of the ends of the molded body in some cases) as occurs with a liquid during the compacting step. Moreover, the dry lubricant films afford the economy of repeated reuse of the same lubricant film.

The invention is especially useful in manufacturing ceramic tubing from comminuted, non-plastic, ceramic material, such as alumina, magnesia, mullite, forsterite, zirconia, berylia, etc. However, it can also be used to mold tubular bodies of other granular inorganic material, such as metal powders, and also granular organic material, such as comminuted synthetic plastics.

The following example will further illustrate the invention. Mold 10 is made of a 6 inch length of commercial unalloyed aluminum pipe with an inside diameter of ¾ inch and a wall thickness of ⅛ inch. The lubricant film 14 is formed by a Molynamel "E" coating about 0.001 inch thick. The liner 16 is formed from 0.001 inch thick brass shim stock. Elastic tube 22 is made of a 8½" length of soft rubber tubing having a ⅜" outside diameter and a wall thickness of about 1/16". Tube 24 is formed from a 9" length of aluminum tubing ¼" in outside diameter. The moldable material 26 is composed of about −200 mesh (Tyler) alumina powder (i.e. T–61 alumina powder sold by the Aluminum Company of America) and 5% of a granulated, waxy, solid polyethylene glycol binder (i.e. Carbowax 20M sold by the Union Carbide Corporation). The pressure fluid consists of 85 parts by volume glycerine and 15 parts by volume of water. The pressure fluid is subjected to about 20,000 p.s.i. for merely a few seconds. During ejection, the alumina tubing with the adhering brass shim stock liner is pushed out of the Molynamel "E" coated aluminum pipe mold by a circular ram. The tubing, after peeling off the brass shim stock liner, has an extremely smooth (virtually polished), straight, uniform outside surface. This tubing is subsequently fired to sinter the compacted ceramic into a strong, coherent body and to burn out the polyethylene glycol binder.

Instead of applying the lubricant coating to the inside wall of mold 10, is in the example above, the lubricant can alternatively be applied to one side of the metal shim stock liner 16 and then this coated liner is disposed in the mold 10 with the lubricant coated surface resting against the inside mold wall.

In another example, a magnesia tubing is made in the same manner as the alumina tubing of the previous example except for the following changes: the lubricant film 14 is formed as a dried dispersion coating of polytetrafluoroethylene, the liner 16 is a lacquer coating (i.e. BFC #33–28 peelable lacquer coating manufactured by Better Finishes and Coatings, Inc., Newark, New Jersey) about 0.005″ thick sprayed or dip coated onto the polytetrafluoroethylene film 14, the moldable ceramic material consists of −325 mesh (Tyler) magnesia powder having a purity of about 99.0+% and 8% of Carbowax 20M. The lacquer film covered, magnesia tubing is easily pushed out of the lubricant film coated mold 10 by the ram and the lacquer film is readily stripped or peeled off the tubing leaving a smooth, straight, uniform surface. The magnesia tubing is then fired to sinter the material and burn out the binder. If desired, the lacquer coating can be left on the tubing and burned off during sintering.

In a third example, an alumina tubing is made as in the first example above except for the following changes: the liner 16 is a sheet of polyethylene coated freezer paper or highly calendered paper, the moldable material 26 is composed of −325 mesh (Tyler) Alcoa A–14 alumina powder and about 1% of Carbowax 6000 as a binder (a solid, waxy, polyethylene glycol sold by the Union Carbide Corporation). After ejecting the paper covered alumina tubing, it is fired to burn off the paper and binder as well as to sinter the compacted alumina material into a strong coherent tube. Of course, the paper can be stripped off prior to firing when desired.

As a fourth example, the lubricant film 14 and liner 16 are formed as an integral layer by using a very thin sheet of polytetrafluoroethylene to serve both purposes of lubricant and liner. An alumina tubing is made as in the first example except for the use of the double purpose sheet of polytetrafluoroethylene. Upon ejection, the polytetrafluoroethylene sheet is readily stripped off leaving a smooth, straight, uniform surfaced alumina tube, which can then be fired as before.

It should be noted that, although the lubricant film can also serve as the liner, as in the preceding example, this can be done only when the lubricant film is not adherently coated onto the inner wall of mold 10. Thus, if the shim stock liner 16 in the first example above were to be left out, the ceramic moldable material will stick to or be somewhat adhered to the surface of the lubricant film 14 during compaction thereby causing severe ejection difficulties.

Although the present invention has been described with respect to specific details of certain embodiments thereof, it is not intended that such details be limitations upon the scope of the invention except insofar as set forth in the claims. Moreover, the use of the terms "tubular" and "annular" in this specification and in the claims is not intended to be limited to merely circular cross-sectional configurations, but is intended to include other cross-sectional configurations, such as oval.

What is claimed is:

1. A method of molding tubular bodies from comminuted moldable material comprising providing a tubular mold member, coating the inner wall of said mold member with a film of low friction, dry lubricant, disposing against and over said lubricant film a support liner of thin, smooth surfaced, flexible material, disposing an elastic expandable tube in said mold member concentrically spaced inwardly from said liner to form an annular mold cavity therebetween, charging and confining comminuted moldable material in said cavity, subjecting said elastic tube to fluid pressure so as to cause said tube to expand and compress said moldable material between said liner and said tube to form a tubular body, removing said fluid pressure, ejecting said tubular body, with said support liner surrounding it, from said mold member prior to firing said tubular body to cause sintering thereof, and then firing said tubular body to cause sintering thereof.

2. A method according to claim 1 wherein the material of said lubricant is predominantly polytetrafluoroethylene.

3. A method according to claim 2 wherein the material of said lubricant film is about 75% polytetrafluoroethylene and 25% molybdenum disulfide.

4. A method according to claim 1 wherein said liner is formed of shim stock.

5. A method according to claim 3 wherein said liner is formed of shim stock.

6. A method according to claim 5 wherein said moldable material is nonplastic ceramic material.

7. A method according to claim 1 wherein, immediately prior to ejecting said tubular body, said mold member is heated to a temperature below the sintering temperature of said comminuted moldable material.

8. A method of molding tubular bodies from comminuted moldable material comprising providing a tubular mold member, providing a support liner of thin, smooth surfaced, flexible material adapted to be placed against and cover the inner wall of said mold member, coating the surface of said liner that is intended to be placed against said inner wall with a film of low friction, dry lubricant, disposing said liner in said mold member so as to cover said inner wall with the film coated surface lying against said inner wall, disposing an elastic expandable tube in said mold member concentrically spaced inwardly from said liner to form an annular mold cavity therebetween, charging and confining comminuted moldable material in said cavity, subjecting said elastic tube to fluid pressure so as to cause said tube to expand and compress said moldable material between said liner and said tube to form a tubular body, removing said fluid pressure, ejecting said tubular body, with said support liner surrounding it from said mold member prior to firing said tubular body to cause sintering thereof, and then firing said tubular body to cause sintering thereof.

9. A method according to claim 8 wherein the material of said lubricant film is predominantly polytetrafluoroethylene and said liner is formed of shim stock.

10. A method of molding tubular bodies from comminuted moldable material selected from the group consisting of ceramic and metal, comprising providing a tubular mold member, lining the inner wall of said mold member with a thin sheet of polytetrafluoroethylene, disposing an elastic expandable tube in said mold member concentrically spaced inwardly from said lining to form an annular mold cavity therebetween, charging and confining comminuted moldable material in said cavity, subjecting said elastic tube to fluid pressure so as to cause said tube to expand and compress said moldable material between said lining and said tube to form a tubular body, removing said fluid pressure, ejecting said tubular body, with said lining surrounding it, from said mold member prior to firing said tubular body to cause sintering thereof, and then firing said tubular body to cause sintering thereof.

11. In an apparatus for molding tubular bodies from comminuted moldable material comprising a tubular mold member with the inner wall thereof constituting a molding surface, an elastic expandable tube disposed through said tubular mold member and concentrically spaced inwardly from said inner wall to form an annular mold cavity therebetween, and pressure fluid filling said elastic tube, the improvement comprising a mold liner of thin, smooth surfaced, flexible material disposed over said inner wall and a thin layer of low friction, dry lubricant disposed between and in contact with said inner wall and said mold liner.

12. An apparatus according to claim 11 wherein the material of said lubricant is predominantly polytetrafluoroethylene.

13. An apparatus according to claim 12 wherein the material of said lubricant film is about 75% polytetrafluoroethylene and 25% molybdenum disulfide.

14. An apparatus according to claim 11 wherein said mold liner is formed of shim stock.

15. An apparatus according to claim 13 wherein said mold liner is formed of shim stock.

16. In a method of forming tubular bodies by confining comminuted moldable material in an annular space formed in a tubular mold by the inner mold wall and an elastic expandable tube concentrically spaced inwardly from said mold wall, thereafter subjecting said tube to fluid pressure so as to cause said tube to expand and compress the said material between said tube and said inner mold wall to form a tubular body, and then removing said fluid pressure to allow for ejection of said tubular body from said mold, the improvement comprising: (a) providing, between said moldable material and said mold wall prior to subjecting said tube to fluid pressure, a layer of low friction, dry lubricant and a layer of thin, smooth surfaced, flexible material, said low friction layer being in contact with said mold wall and said smooth surfaced layer being in contact with said moldable material, (b) ejecting said tubular body, with said flexible material layer surrounding it, from said mold after removing said fluid pressure, but prior to firing said tubular body to cause sintering thereof, and (c) then firing said tubular body to cause sintering thereof.

17. In a method of forming tubular bodies by confining comminuted moldable material in an annular space formed in a tubular mold by the inner mold wall and an elastic expandable tube concentrically spaced inwardly from said mold wall, thereafter subjecting said tube to fluid pressure so as to cause said tube to expand and compress the said material between said tube and said inner mold wall to form a tubular body, and then removing said fluid pressure to allow for ejection of said tubular body from said mold, the improvement comprising: (a) providing, between said moldable material and said mold wall prior to subjecting said tube to fluid pressure, a film of low friction, dry lubricant in contact with said mold wall and a support liner of thin, smooth surfaced, flexible material in contact with said moldable material, (b) ejecting said tubular body, with said support liner surrounding it, from said mold after removing said fluid pressure, but prior to firing said tubular body to cause sintering thereof, and (c) then firing said tubular body to cause sintering thereof.

18. In a method of forming tubular bodies by confining comminuted moldable material in an annular space formed in a tubular mold by the inner mold wall and an elastic expandable tube concentrically spaced inwardly from said mold wall, thereafter subjecting said tube to fluid pressure so as to cause said tube to expand and compress said moldable material between said tube and said inner mold wall to form a tubular body, and then removing said fluid pressure to allow for ejection of said tubular body from said mold, the improvement comprising: (a) prior to placing said moldable material in said annular space, coating said inner mold wall with a low friction, dry lubricant and disposing over said lubricant coating a support liner of thin, smooth surfaced, flexible material, (b) ejecting said tubular body, with said support liner surrounding it, from said mold after removing said fluid pressure, but prior to firing said tubular body to cause sintering thereof, and (c) then firing said tubular body to cause sintering thereof.

References Cited by the Examiner

UNITED STATES PATENTS

| 935,529 | 9/09 | Maag. | |
|---|---|---|---|
| 1,226,470 | 5/17 | Coolidge | 18—59.5 |
| 1,412,392 | 4/22 | Earley | 25—122 |

OTHER REFERENCES

Teflow article (Dupont), pages 13 and 16, August 1957.

ROBERT F. WHITE, Primary Examiner.

MORRIS LIEBMAN, ALEXANDER H. BRODMERKEL, Examiners.